March 3, 1931. P. JOLY 1,795,212
TELEPHONY AND TELEGRAPHY
Filed Sept. 22, 1924     8 Sheets-Sheet 2
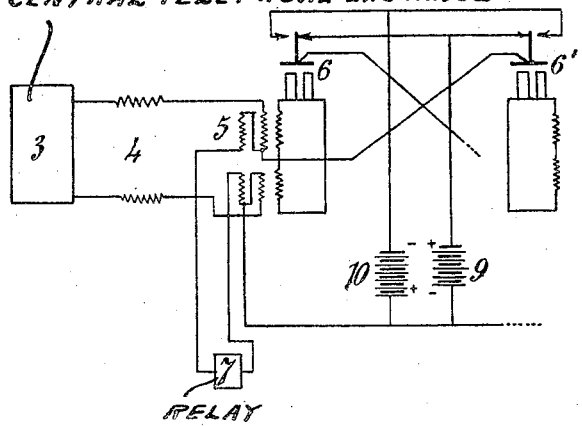
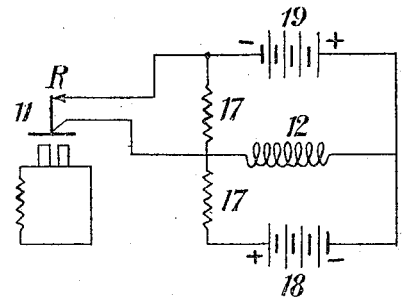
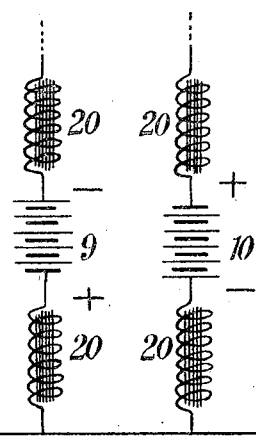
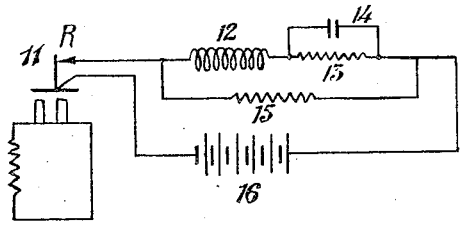

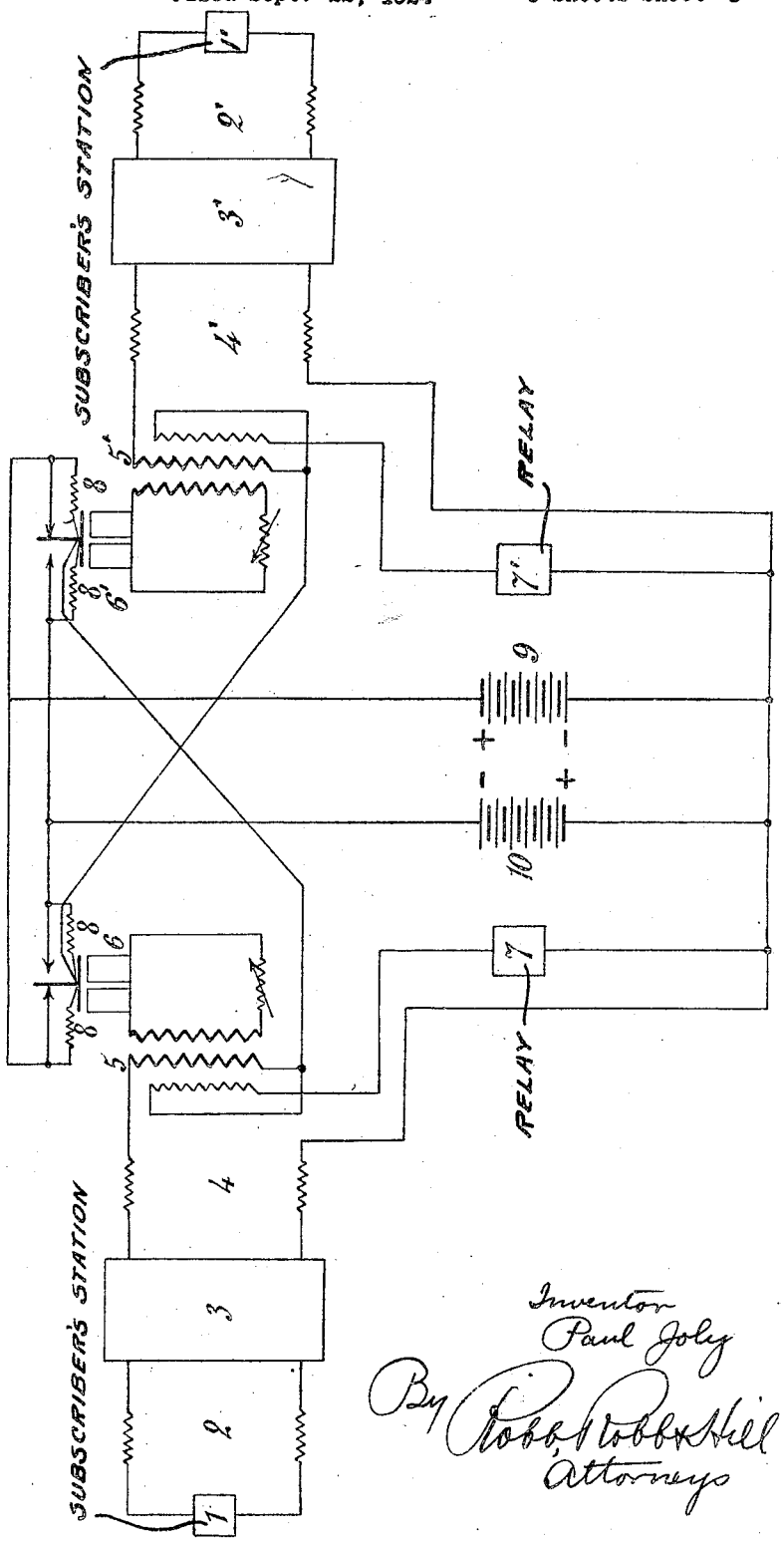

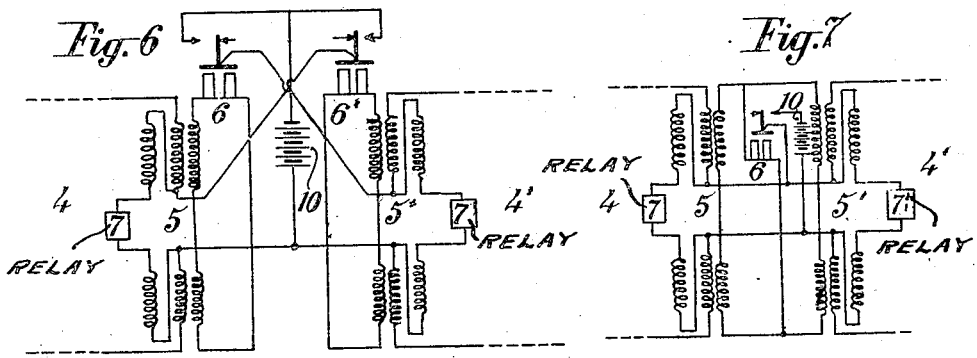
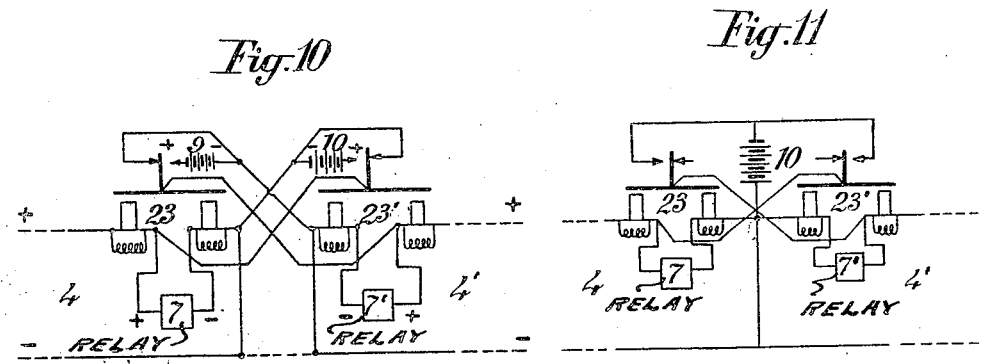
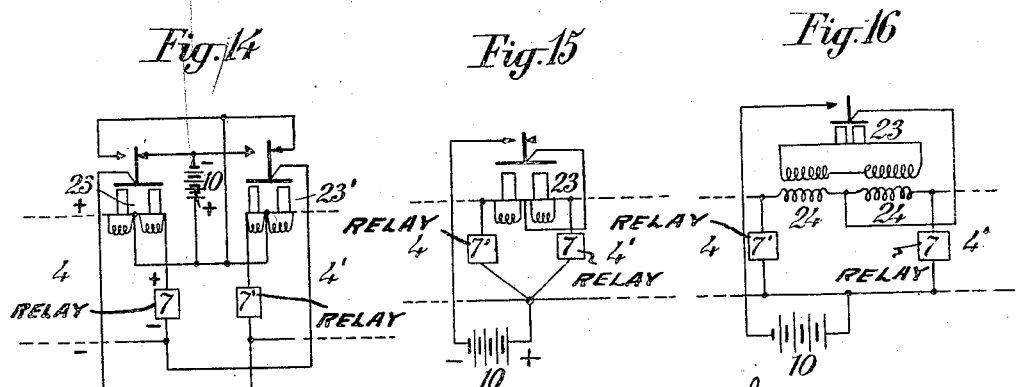

March 3, 1931. P. JOLY 1,795,212
TELEPHONY AND TELEGRAPHY
Filed Sept. 22, 1924   8 Sheets-Sheet 4
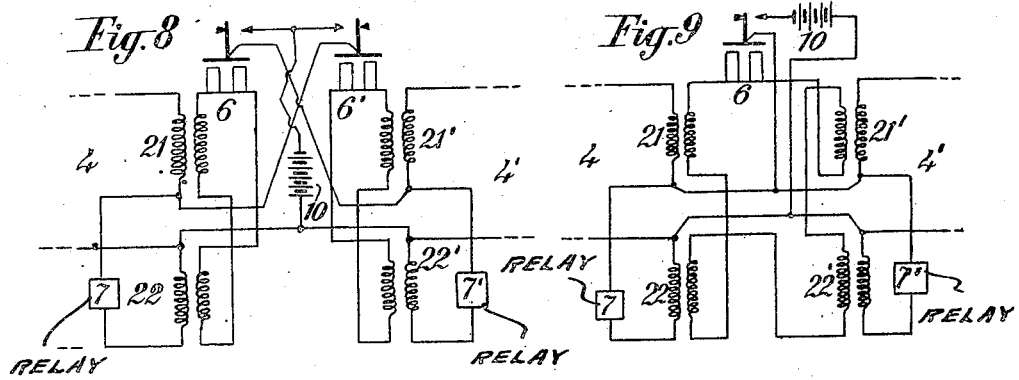
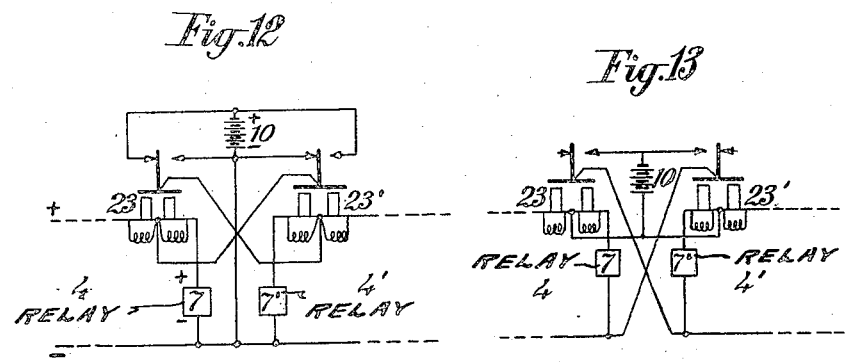
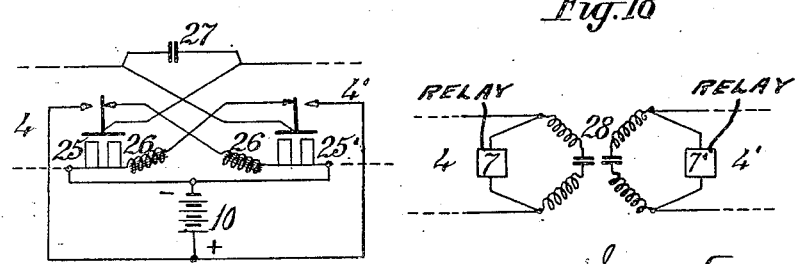
Inventor
Paul Joly
By Robb Robbs Hill
Attorney

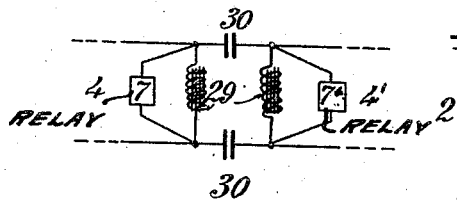
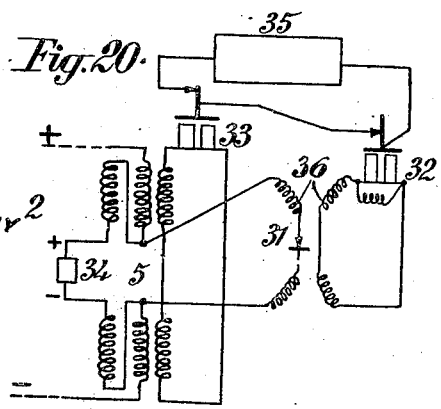
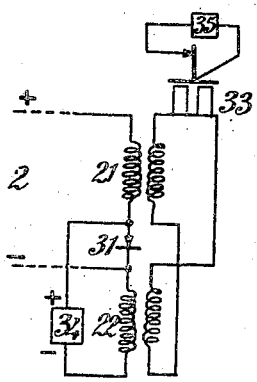
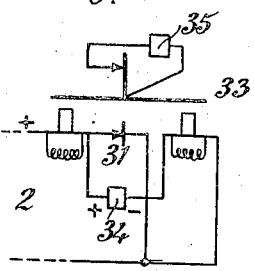
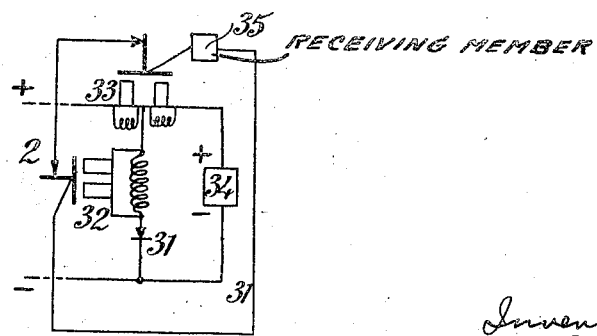

March 3, 1931.  P. JOLY  1,795,212
TELEPHONY AND TELEGRAPHY
Filed Sept. 22, 1924   8 Sheets-Sheet 6
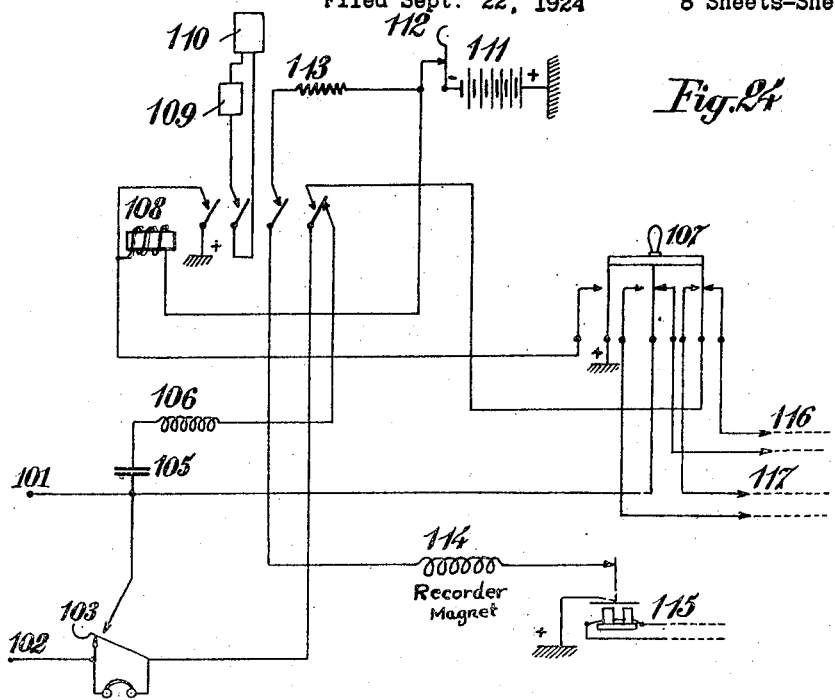
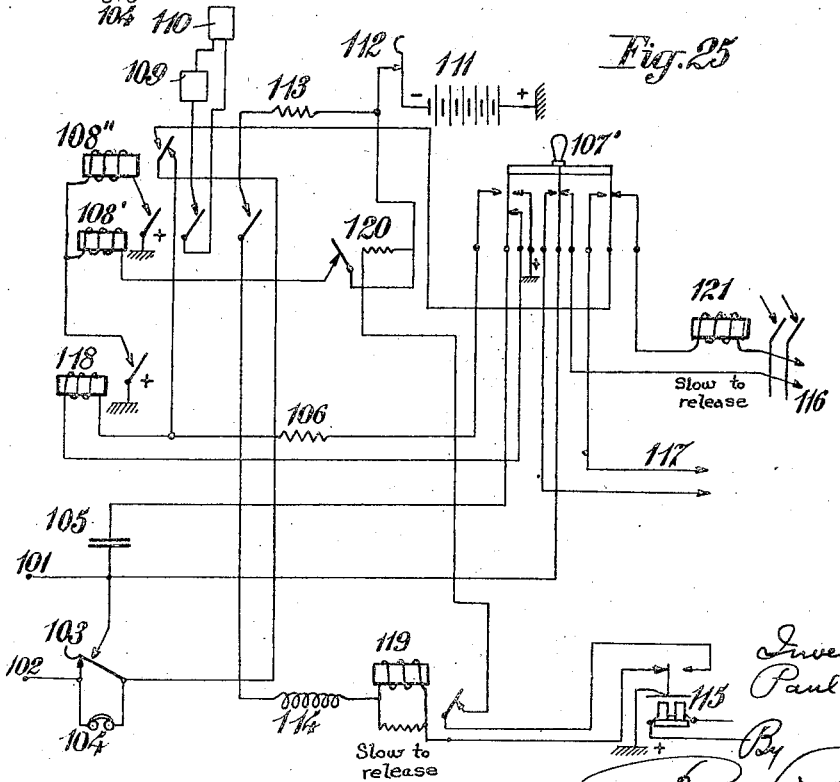

March 3, 1931.  P. JOLY  1,795,212
TELEPHONY AND TELEGRAPHY
Filed Sept. 22, 1924   8 Sheets-Sheet 7
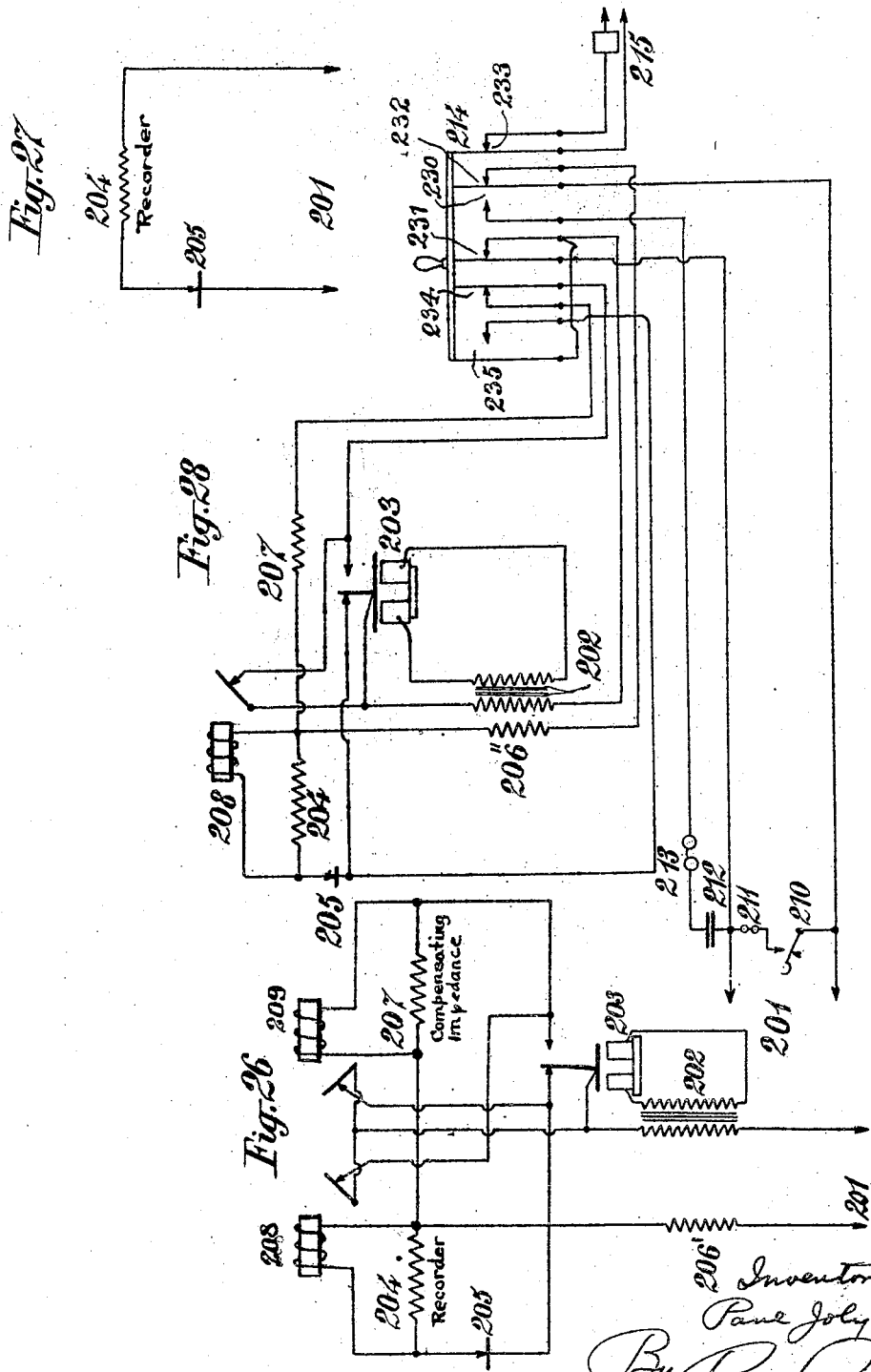

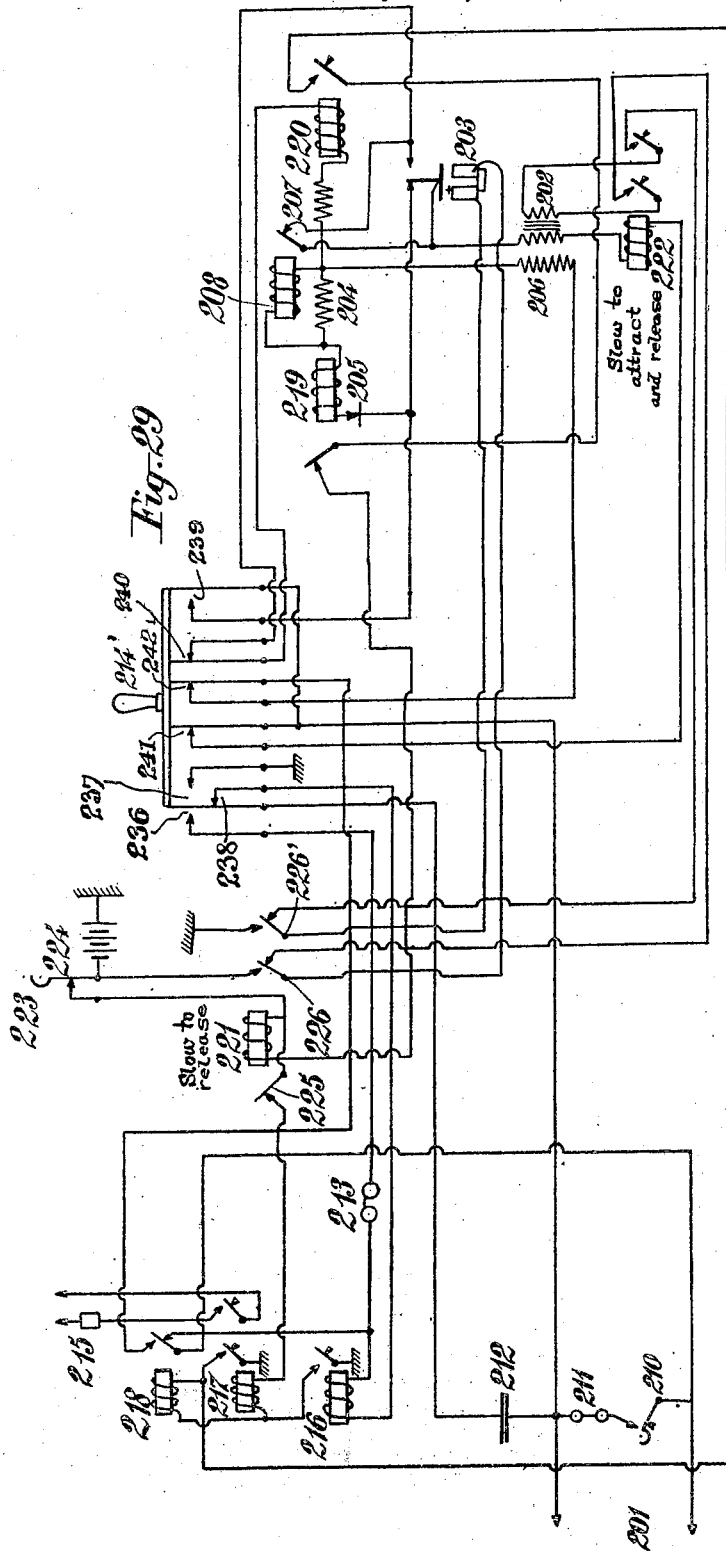

Patented Mar. 3, 1931

1,795,212

UNITED STATES PATENT OFFICE

PAUL JOLY, OF PARIS, FRANCE

TELEPHONY AND TELEGRAPHY

Application filed September 22, 1924, Serial No. 739,106, and in France September 29, 1923.

The means which form the subject of the present invention permit a telephone subscriber who is provided with ordinary telegraph apparatus to exchange communications with any subscriber who is connected to the telephone network and having the same telephonic apparatus. Certain improvements moreover permit duplex transmission.
The invention is capable of many modifications occasioned by the various ways of supplying current, the type of transmission ("simplex" or "duplex"), and by the manner of transmitting and receiving adopted by the subscribers.

The working principle, whether it concerns the amplifying relay arrangements situated over a special double contact string, the special position which will be termed a "mixed position," or the receiving or transmitting means which are situated at the subscribers' stations, is based upon the use, while still rendering telephonic communication possible, of induced or displacement currents, (i. e. where there are inductances and condensers at the exchange in place of transformers), these currents being produced by breaking and making the circuit carrying a current necessary for the transmission of the telegraph signals for actuating, either directly or through transformers, (these latter being telephonic translators whose windings are suitably associated and connected), sensitive and rapid relays (shunted or otherwise) which control the make and the break of a current in a circuit over which signals transmitted by the transmitting station may be thus reproduced with the desired amplification. Such circuit may either be a line over which retransmission is effected (starting from the "mixed position") or the circuit of the receiving telegraph apparatus (at the subscribers' station).

The complete arrangement for transmitting telegraphic signals over telephone circuits, which may comprise translaters or inductances and condensers, necessitates the use both of a special arrangement ("mixed position") in a telephone exchange and of a special mounting at the subscriber's station.

To explain the invention clearly the various exemplifications will be grouped into two classes.

The "mixed position" and its modifications will first be described, and then those of the arrangements at the subscriber's stations.

In the accompanying drawings Figure 1 shows a complete installation, Figure 2 one of the transmitters of the "mixed position", Figures 3 and 4 show details, Figure 5 arrangements of inductance bobbins, Figures 6 to 19 modifications of the "mixed position" arrangements, Figures 20 to 23 modifications of the arrangements at the subscriber's stations, Figure 24 an arrangement for changing telephony to telegraphy and vice versa, Figure 25 an arrangement whereby automatic telephonic reception can also be obtained, Figures 26 to 29 current supply arrangements from the central exchange for receiving and transmitting.

Circuit 2 or 2', the subscribers' lines, comprises a battery either at the station 1 or station 1', the subscribers' stations or at the telephone exchange at 3 or 3', the central telephone exchange. The breaks and makes of this circuit, or reversals of current are produced at 1 or 1' at such times when transmitting signals cause in the line 4 or 4' the auxiliary central exchange telephonic lines over members 3, or 3' at the telephone exchanges, which may be translaters, condensers and inductances, currents induced in opposite directions which currents induce in their turn at the secondary of transformer 5 or 5', transformers having two identical primaries but with opposed electro magnetic action and with a secondary with suitable transformation relation, working or normal currents which bring the armature of the relay 6 or 6' (sensitive and rapid relay, a Baudot relay for example) against either its working or back contact thus reversing the current in the lines 4' and 7', or 4 and 7 (7 and 7' being the equivalent artificial lines respectively to the lines 4 and 4') and thus giving use to the possibility, by suitably selecting the tension of the batteries 9 and 10, of reproducing with any desirable amplification the initial disturbance corresponding to the signal transmitted.

The artificial lines 7 and 7' adjustable by the aid of lever switches, for example, and possibly with control by a milliampere meter or a volt meter inserted successively for the regulation over the secondary circuits of transformers 5 and 5' or upon a wire of lines 4 or 7 and 4' or 7', which form double diagonals of a bridge, whose four branches are formed of batteries 9 and 10 and of two of the four suitable resistances 8, are so established that any variation of current effecting equally and simultaneously the two primaries of transformers 5 and 5' produce no electromagnetic effect upon the core of these transformers and therefore no induced electromotive force in their secondary. The current reversals produced over line 4' or 4 by the operation of the relay 6 or 6' will have no effect upon the relay 6' or 6 but will induce through the members 3' or 3 currents which are received at the receiving station 1' or 1 in a sensitive and rapid relay (a Baudot relay) suitably arranged and controlling, directly or otherwise, the receiving apparatus.

The members 5, 5', 6, 6', 7, 7', 8, 9 and 10 form a portion of a special position in a telephonic exchange which is termed "mixed position" (manual or automatic) and may be connected either manually as by the aid of double contact strings or automatically to an exchange or to a subscriber's station. The signalling members, call, operator's enquiry ring off, etc., may exist either in the usual or in a slightly modified form for adaption to the new conditions of working the circuits.

In order to obtain a more complete equilibrium over lines 4, 4', 7, 7', preferably each primary of transformers 5 and 5' is formed with two identical windings arranged each upon a line wire at the beginning of each line, as shown in the diagrammatic Figure 2 which shows one only of the transformers 5 or 5'.

If it be desired to have control of the telegraphic communications exchanged, a sensitive and rapid receiving relay (a Baudot relay) which controls a telegraphic receiving apparatus may be interposed in the circuit of the secondary of a transformer whose primary is in artificial line 7 or 7' or between the common pole of batteries 9 and 10 and the lines 4 and 7 (or 4' and 7'). This arrangement, when inserted in the line 7' or between the common pole of the batteries and the line 4' and 7' allows a transmission from station 1 to be recorded, and when inserted in the line 7, or between the common pole and the lines 4 and 7 a transmission from station 1'.

The resistances 8 when employed have a triple object:

1. To suppress arcing at the contacts.

2. To form the two branches of a bridge, whose two other branches are formed by the batteries 9 and 10 which may or may not have suitable inductances or resistances in series, and whose diagonal is formed by lines 4 and 7 or 4' and 7' in parallel.

3. To allow the circuits 4 and 4', over which the induced currents are propagated, to close.

The arrangement is adaptable for telephoning by merely arranging identical inductances 20 at each pole of batteries 9 and 10, as shown in Figure 5, or by adapting one of the arrangements described under the VIII hereinafter:

The modifications to be described which are applicable to the specification position or "mixed position" are numbered I to IX.

I. The resistances 8 shown in Figure 1 may be eliminated.

II. The batteries 9 and 10 in the same figure or in Figure 2 may be connected in various manners according to the different manners of supplying circuits 4 and 4' with current. Thus it may normally be useless or it may be necessary to supply one of such circuits or two thereof with current; in this latter case this may be effected by a battery situated either at the telephone exchange or at the "mixed position."

These different cases determine the connections to be effected between lines and battery on the one hand, or the contacts and relay armatures on the other hand, and there are as many cases as there are arrangements.

The break points of the circuits controlled by the relays are at one of the leads of a primary winding of a differential transformer and such lead may be connected directly either to the corresponding artificial line or to the other primary winding.

The batteries 9 and 10, in particular, may be connected to the contacts of relays 6 and 6':

(a) Either for feeding lines 4 and 4' through the back contact or by the working contact.

(b) Or for alone feeding these lines either through the back contact or through the working contact, the other pole of the batteries being connected to a point common to the real and artificial lines while the other contact of the relay may:

(a) Either remain isolated.

(b) Or be connected to the other point common to the real and artificial lines.

In many cases a single battery can alone be used, battery 10 for example. It may then be connected to the contacts and lines according to the modifications above set out.

The arrangement shown in Figure 6 is directly derived from the arrangement shown in Figure 1 or Figure 2—resistances 8 have been eliminated, and as the circuits are supposed to be normally without current, one battery only is employed which supplies the working currents.

Explanation of the working and of the function of transformers 5 and 5' and of the relays 6 and 6' is the same as that given in relation to Figure 1.

From the corresponding explanations given with regard to the modifications as set out above, the necessary information with regard to a particular case can easily be deduced.

For the sake of shortness explanations already given will not be repeated in the following description of modifications.

All the modifications of the connections given at the commencement under II will be considered and applied to each of the modifications of arrangements which have been above described. They will not be repeated. My description will be in reference to Figures 7 to 17, which show arrangements relating to the transformer relays, the artificial lines, and break points of the lines and connections between batteries, lines, contacts and relay armatures. In many cases moreover different types are employed.

III. The duplex types to be described are capable by means of a slight modification of being employed in the "simplex" current shown in Figure 7. For this purpose the two secondaries of transformers 5 and 5' are placed in series by interpolating a single sensitive and rapid relay 6, in shunt upon each of the two secondaries, and the symmetrical points common to the real lines and to the artificial lines are metallically connected, the break point being between such two metallic connections. This relay controls the breaking and making of the circuit both in lines 4, 4', 7 and 7'.

IV. In place of transformers 5 and 5' composed of two differential primary windings and a single secondary winding, the primary windings may be separated by forming two transformers each having a primary winding and a secondary winding 21, 22, 21' and 22', as illustrated in Figures 8 and 9 which are arrangements corresponding respectively to the arrangements shown in Figures 6 and 7.

V. Sensitive and rapid relays may be used in place of transformers, such relays being shunted by an inductance (transformer windings in particular) over which the induced or displaced currents and the working currents have the same effect as over the relays on the secondary windings of the transformers. For this purpose the relays (with two bobbins) must be suitably formed as differential relays.

In each of the arrangements hitherto described and in all their modifications there may correspond an arrangement based upon the same working principle as that shown in Figure 1 and Figure 6 but comprising a relay or one of the two bobbins of such relay shunted at such places where the corresponding arrangement comprises a transformer.

Just as for their equivalents, types of arrangements showing the relative positions and the connections of the real and artificial lines of the relays and break points in the lines are given by way of illustration. The modifications of the connections indicated under II are just as applicable here as when transformers are employed.

In the arrangements shown in Figures 10 to 16, 23, 23' the sensitive and rapid relays are shunted by a suitable inductance. The diagram shown in Figure 10 is formed by supposing a modification of the arrangement where lines 4 and 4' are normally supplied with current from batteries situated at the telephonic exchanges; the dotted lines may be formed and this then allows a battery (9 or 10) to be economized. In the modification shown in Figure 11 lines 4 and 4' have been supposed to be normally not supplied with current. In the modification shown in Figure 12 the connections are established by supposing lines 4 and 4' to be normally supplied with current from a battery 10 situated as regards one line at the end of the line, and as regards the other line at the "mixed position".

The arrangement shown in Figure 13 differs from the preceding arrangements in that there is a fixed connection between the middle points of the relays. It is suitable where it is unnecessary that lines 4 and 4' should normally be supplied with current. The arrangement shown by the dotted line may be employed where "duplex" action is not required. The arrangement shown in Figure 14 is of the same type as that shown in Figure 13. It shows a modification of the connection where lines 4 and 4' are normally supplied with currents by a battery, situated as regards one line at the telephone exchange and as regards the other line at the "mixed position".

VI. In certain special cases which do not normally require current and where "simplex" transmission is sufficient, it is possible by rearranging the circuits to obtain the same results with one differential relay only. It may be shunted (as shown in Figure 15) or it may be in series or in derivation upon the secondary of transformers 24 whose primary windings are in series with one wire of lines 4 and 4' as is shown in Figure 16. In these arrangements the artificial lines are situated as regards the relay or the transformers on the other side of the corresponding real lines.

VII. In certain cases where lines 4 and 4' are normally unsupplied with current the arrangements shown in Figure 17 may be used, 25 and 25' being sensitive and rapid relays employed, either directly or through special transformers, for receiving induced currents or displaced currents flowing through lines 4 and 4' and controlling the making and the breaking of the circuits of the retransmission currents over the other line (4' and 4). Thus an arrangement has been devised, similar to that for telegraphic translations, for the transmission of telegraphic signals over telephone circuits through transformers or condensers. The inductances 26 and a condenser 27 are provided for ensuring telephonic communication.

VIII. In order to ensure telephonic communication in the various arrangements hitherto described where the arrangement employed does not of itself ensure it, recourse has been had to inductances. However in place of pure inductances there may be employed:

(a) Either transformers of a ratio 1/1 whose windings, whether comprising common points or not, are broken or are not broken by condensers as may be required.

(b) Or condensers associated with inductances which may or may not be special inductances according as the parts employed have or have not sufficient inductance.

As the circuits of the real and artificial lines are back circuits they should close each either upon a winding of transformer 28 Figure 18, or as shown in Figure 19 upon inductances 29, the condensers 30 in this latter case being between the symmetrical points common to the real and artificial lines of the two circuits.

IX. Finally, in order to complete the explanation relating to this first type of modifications, it is well to indicate that according to the arrangement of the line (resistance, the presence of several transformers etc.) it may be necessary to arrange between the subscribers' stations either one only of the preceding arrangements described or several of such arrangements which are stopped and form retransmitting relays.

A second object of this invention as has before been stated, groups the modifications of arrangements situated at the subscribers' stations. These arrangements may be more or less simple according to the ease of reception or of transmission it is desired to reserve to the subscriber.

At the receiving station one of the following arrangements may be employed:

1. A rapid and sensitive relay (a Baudot relay for example) shunted by a suitable inductance.

2. A transformer primary whose secondary is closed over a rapid and sensitive relay with or without a resistance in series.

3. A transformer similar to transformer 5 or 5' which necessitates the use of a suitable artificial line fulfilling the same function as line 7 or 7' but permits "duplex" transmission.

These arrangements may be connected with the aid of a press button, a switch or other suitable means, which may be automatic over the line for allowing either reception alone or reception and transmission with local control of transmission.

Where the receiving apparatus has a high inductance and for the purpose of avoiding sparking at the contacts of the rapid and sensitive receiving relay, which in another case should directly control the receiving apparatus, another relay whose action is not impeded by sparking may be controlled by this relay. This second relay then directly controls the receiving apparatus. The diagrammatic arrangement shown in Figure 3 or that shown in Figure 4 may also be employed.

In these figures 11 is the sensitive and rapid receiving relay 12 the electro magnet of a receiving apparatus having a high self-induction; 13 is a resistance combined with a condenser 14 for compensating the effect of inductance; 15 is a shunt resistance, 16 the feed battery, 17 two equal resistances, 18 and 19 two equal batteries in series; and R the back contact of relay 11.

(A) The first arrangements illustrated in Figures 20 to 23 can easily be deduced from the arrangements hereinbefore described.

The reason therefor is that a subscribers' station has a function comparable to that of mixed position but it is simpler because no retransmission is necessary. In principle, in the first modifications to be described, the arrangement for a station can be deduced from the mixed position arrangement by dividing up the "mixed position" arrangement into two parts.

Thus Figures 20, 21, 22, 23, have been deduced from the arrangements shown in Figures 6, 8, 10 and 12. In Figures 20, 21, 22, 23,—31 is the transmitting member (switch), 32 the transmitting relay, which may or may not be shunted, 33 the receiving relay which may or may not be shunted, 34 the artificial line balancing the real transmission and receiving circuit; 35 is the receiving member.

The connections indicated in dotted lines may be substituted for the others; they indicate merely that the transmitting relays may either be shunted or placed upon the secondary of a transformer just as the receiving relay as has already been indicated.

The arrangements shown in Figures 20 and 23 permit "duplex" transmission with local control with the condition however that there are two telegraphic receiving apparatus controlled each by a relay 32 or 33. These figures show the case of "simplex" transmission with automatic local control. The arrangements shown in Figures 21 and 22 do not permit "duplex" transmission, but allow the control of transmission by "reflexion" upon the mixed position, where retransmission at the mixed position is effected simultaneously over lines 4 and 4'.

(B) In the preceding description it has been supposed that the subscribers' station remains in the telegraphing position.

In this paragraph switching apparatus is described by which, as in Figure 24, the subscriber can easily pass from the "telegraphing" position to the "telephoning" position and vice versa, or which allows, as shown in Figure 25, the exchange of telephonic or telegraphic communications and the automatic reception of telegrams in the subscriber's absence.

(I) Station in which switching is effected by a key without relay for automatic action (manual switching). Either one or two switches may be provided for changing from the telephoning position to the telegraph transmitting or receiving position and vice versa, and from this latter position to the telegraph receiving or transmitting position and vice versa, the subscriber's telegraphic apparatus being brought in action when the switch is in the telegraphing position.

(II) Station in which switching is effected by keys and a relay automatically brought into action (semi-automatic switching).

This second station which forms one of the subjects of the invention is shown diagrammatically in Figure 24. In this figure 101 and 102 are the line wires, 103 the telephone hook switch of station 104, 105 the condenser and 106 the station telephone bell, 107 a switch allowing: in one position:

(a) The setting of relay 108 for bringing the telegraph system in action, for example the motor 109 fed from the sector 110, or it may be the electro-magnet 114 of the apparatus etc.

(b) Telegraphic transmission or reception by connecting at 117 the transmitting or receiving arrangement.

In another position: telegraphic reception or transmission by connecting at 116 the receiving or transmitting apparatus.

111 is the station battery, and 112 a switch for interrupting the battery in order to bring back the arrangement to normal. This switch may be made a part of 107 by giving the latter switch a third position. 113 is a resistance which may be useful in certain cases. 115 is a sensitive and rapid relay controlling the apparatus 114.

The presence of relay 108 allows the number of switch contacts or switches provided with manual switching to be reduced.

(III) Station in which switching is effected by a switch and relay for allowing automatic starting into action and automatic reception of telegrams (automatic switching). This station may be used in all cases and is shown diagrammatically in Figure 25.

It renders possible the following operations:

(a) To telephone, if the station is to be used solely for telephony.

(b) To telegraph (receive or transmit); the subscriber can by a simple manipulation arrange the apparatus for this purpose and conversely can bring the parts into the telephoning position.

(c) To receive a telegraphic communication in the absence of the subscriber.

In Figure 25 a number of members are shown similar to those in Figure 24. They are given the same reference numbers.

In Figure 25 switch 107' has three positions; the left hand position, which will be termed position (1) corresponds to the "telegraphic telephone-transmission" position; the mid position, position (2), which is that shown in the figure, corresponds to the receiving position whether the subscriber is present or absent; the right hand position, position (3), which may advantageously be a "return" position, corresponding to the "starting" position.

The relay 108 of Figure 24 is replaced by two relays 108' and 108'' which may be provided with as many springs as may be necessary to control the starting of all relays and necessary parts; these relays are set by the relay 118 which is sensitive to alternating current, itself attracted either when with 107' in the mid position a call current is sent over line 101—102, or when with 107', in the right hand position, the battery at the central telephone exchange delivers over it. 119 is a relay, which may be shunted, suitably slow acting as regards release and controlled relay 120 which brings the relays 108' and 108'' into their back position.

The relay 121 is a relay which is suitably slow acting as regards attraction and release.

It has for object:

(a) To bring relay 115 into action only after the disappearance of the induction effect produced when the receiving apparatus is being placed in circuit over the line, and this with the object of not bringing the relay 115 in its operative position and of bringing back the system to normal.

(b) To leave the arrangement for a short period in a state to receive an impulse after the complete return to normal at the finish of a telegraphic communication sent in the absence of the subscriber as will be described.

If the subscriber wishes to employ his instrument for telephoning he places the switch in position (1).

To telegraph he places the switch in position (3) which starts the system and then brings back to position (2) or to (1), according as he desires to receive or to transmit.

In order to telephone after having telegraphed he takes off the telephone after having placed the switch in position (2). To telegraph after having telephoned he replaces the telephone and places the switch in position (1) or (2) according as he desires to transmit or receive.

To conclude and bring all the parts back to normal:

(a) After a telegraphic communication (the telephone being hung up) he places the switch in position (2) and oscillates the hook switch or places the key in position (2) and momentarily breaks circuit with the returning switch 112.

(b) After a telephonic communication (the switch being in position 2) he may again hang up the telephone and break the circuit by the return key 112. A subscriber desiring to receive telegrams in his absence leaves the switch in position 2.

The system is released by operating relay 118 under the influence of call alternating current from the central telephone exchange and the station is ready to receive after operation of relays 108', 108'', 119 and 121.

When a caller again hangs up the telephone (i.e. opens his circuit), the resulting inductive effect at the called apparatus brings the armature of relay 115 into its operative position, thus unsetting relay 119 at the end of a fraction of a second. Relay 120 is then operated and breaks the feed of the relays 108 and 108' which come into the back position and open the subscriber's circuit; the breaking of the circuit induces a current in relay 115 and brings it to its back position. The relay 120 is then broken and returns to its back position. The relay 121, slow acting as regards release, comes into its back position a moment after relay 115 has itself come into the back position. In all the preceding explanations it has been supposed that the inducing and induced currents in all the appertaining circuits required for a telegraphic communication were suitably directed to ensure the return of the armature of the sensitive and rapid relay 115 upon its return contact. A proper positioning of the circuits leads to subjecting relay 115 to impulses of reverse direction according as it is desired to transmit or receive and therefore to reverse the current direction in this relay.

Some receiving and transmitting arrangements may require the addition of springs and contacts supplementary to switch 107 or 107' in order to avoid all abnormal operation of the relays. These requirements may easily be foreseen according to the circumstances in view but it should not be lost sight of that in certain cases the making or the breaking of some contacts should take place in a perfectly predetermined chronological order.

Where at the subscriber's station there is a telegraphic apparatus employing positive and negative currents the relay selected should be able to transmit reversals of current caused by the key of the telegraphic apparatus employed into breaks and makes.

(C) In all the preceding there has been presupposed that there is at the subscriber's station a battery for locally feeding an electro-magnet of the telegraphic apparatus employed.

An arrangement will now be described by which such local battery may be eliminated, the necessary current for operating the station being provided by the central telephone exchange battery just as when the telephone is used.

The principle of the arrangement is illustrated diagrammatically in Figures 26 and 27. Figure 26 shows the receiving arrangement and Figure 27 the transmitting arrangement.

When receiving the resistance of the loop line should not vary as otherwise reception is disturbed, also the current feeding the telegraphic apparatus should be broken and made at every revolution. The presence of a compensating impedance and of two relays permits the desired result to be obtained.

Figure 26 shows a station arranged for telephonic reception; in this figure 201 is the income to the subscriber's line, 202 the receiving apparatus which allows the functioning of the sensitive and rapid relay 203 under the action of the currents induced over the subscriber's line. 204 is the electro-magnet of the telegraphic apparatus at the station; 205 the switch arrangement of the apparatus (for example the key for Morse telegraphy, contacts with the Baudot apparatus or the teletype of the Morkrum Company, etc....); 206 a resistance which may be useful in certain cases; 207 the compensating impedance over which the line loops when it is not looped over 204; 208 and 209 are two rapid relays arranged either in shunt on 204 and 207 (if they have a high resistance as illustrated) or in series respectively with 204 and 207 if their resistance is small.

The armatures of relays 208 and 209 come upon their working contact when these relays are traversed by a current. The induced receiving currents passing over line 201 have for effect to bring the armature of relay 203 upon one or other of these contacts. This armature movement prepares for breaking one of the two circuits 204—208 or 207—209; the breaking being effected by the relays 209 and 208.

In some cases one of the two relays 208, 209 may be eliminated; for example relay 208 may alone be employed when the induced current, which brings relay 203 upon its working contact and causes the breaking of the circuit of the electromagnet 204 of the apparatus, is opposite in direction to the feed current of the station which is supplied by the battery at the telephone central exchange. Relay 209 may alone be used when the directions of the induced currents are reversed.

When transmitting it is, as indicated in Figure 27, only necessary for the line 201 to be looped over the manipulating switch 105 and the electromagnet 104 of the telegraphic apparatus.

The principle of the switching apparatus capable of being employed at the subscriber's station and described under (B) above is not modified when the station is fed from the battery at the central telephone exchange.

The circuits may advantageously be altered at the switch when the station is not intended to receive telegrams in the absence of the subscriber and should be provided with some additional relays while in the contrary case the connections should be modified.

There will be described as illustrations two methods corresponding to the two cases aforesaid.

1. Station with manual switching not capable of receiving telegrams in the absence of the subscriber.

The circuit is illustrated in Figure 28 and corresponds to a case where one only of the two relays 208 or 209 shown in Figure 27 are employed. When relay 208 for example is employed,—as in Figures 26, 27 and 28, the same parts bear the same numbers of reference,—210 is the telephone hook switch, 211 the telephone apparatus, 212 the condenser and 213 the telephone bell, and 214 a three position switch; the left hand position in the figure is the telephoning position, the mid position the telegraph receiving position, the right hand position the telegraph transmitting position.

The switch may be provided with other springs and contacts required to bring the parts into operation. In the figure one member only, a motor 215 for example, is supposed to be required; when switch 214 is in the telephoning position the station becomes an ordinary telephone station; when it is in the mid position or in the right hand position telegrams can be transmitted or received and the arrangement shown in Figure 26 or that shown in Figure 27 will be formed.

2. A station with automatic switching for allowing telegrams to be received in the absence of the subscriber. The arrangement is shown diagrammatically in Figure 29.

The parts already shown in Figures 26, 27 and 28 are marked with the same numbers of reference. 216, 217 and 218 are relays whose functions are the same as those of relays 118, 108' and 108'' shown in Figure 25; relay 217 however has one less spring as the electro magnet is no longer fed locally and it should be made suitably slow acting for allowing relay 221 the time to become set. The function of relay 216 is to release the setting of the relays 217 and afterwards of relays 218; 218 is a relay slow acting as regards release which controls the feed of relay 221 (retarded as regards release); relay 220 is made slow acting as regards attraction and has for its object to allow the setting of relay 221 only if the relay 216 has been operated. Relay 217 is affixed and accessorily acts to balance relay 219 so that the assemblage 204, 219, may be compensated by the assemblage 207, 220; the relay 222 is slow acting as regards attraction and release and is intended (just as the relay 221 shown in Figure 21):

(a) To connect the rapid and sensitive relay 203 over the secondary of 202 (i. e. to allow it to come into action) only after the inductive effect corresponding to the closing of circuit 201 over the arrangement at the telegraphic station, has passed.

(b) To connect relay 203 only when the inductive effect, corresponding to the breaking of circuit 201 by the back positioning of relay 218, shall have brought relay 203 into its back postion. This relay 222 is only useful, as will be seen, where the direction of the induced current, bringing relay 203 upon the contact and which closes circuit 1 over the relay 207—220, is the same as that of the feed current for line 201. If the direction of the induced current is reversed, relay 222 is not wholly necessary. The springs and double contacts 226 and 226' shown in Figure 24 on the right of relay 221 may be sufficient to bring relay 203 to its back position, (i. e. in the figure on the left hand contact) owing to a suitable direction of the current given by battery 224 while circuit 201 is broken by the opening of relay 218, a break which from this fact remains without effect upon relay 203. Switch 223 is an optional general circuit breaking switch of battery 224; switch 214' is a three-position switch. The left hand position corresponds to the telephoning and telegraph transmission position, and the mid position, that shown in the figure, to the telegraph reception position, which is effective whether the subscriber is present or absent, and the right hand position to the starting position (it cannot be for the return position).

When the subscriber wishes to use his station as an ordinary telephone station he places switch 214' in the left hand position. If he desires to telegraph he places the switch in the right hand position and brings it into the mid position or the left hand position according as he desires to receive or transmit.

Before telegraphing or telephoning, and after having telephoned or telegraphed, he may desire to bring his switch into the mid position.

To bring all parts to the back position he may operate as has been set out under (B) by manipulating either the hook switch 210 or the switch 223 or also a switch (a return switch for example) substituted for key 223 which will momentarily earth relay 221 which controls the return to the back position by attracting the wing 225.

In order that the station may receive a telegram in the absence of the subscriber switch 214' should be in the mid position; the relay 216, attracted by the effect of alternating call current, causes the attraction of 217, and then of 218, the relays 219 and 222 operating. Owing to the slow action of these relays, relay 203 will remain upon the left hand contact and is ready to receive.

When the calling subscriber has finished his communication he opens his circuit which brings relay 203 upon the right hand contact so causing first the attraction of 220, then the release of 219, then the operation of 221, then the unsetting of 218, afterwards of 217, then of 220, 221 and 222; the induction effect resulting from the breaking of the circuit either through 218 or through the action of the double contacts 226 and 226' of 221, has the function of bringing 203 upon its back contact (left hand contact). The whole arrangement is then brought into the normal position.

In some cases according to the call method employed at the telephone exchange it will be possible to eliminate battery 225 at the subscriber's station for receiving in his absence. To ensure that in this case relays 216—217—218—221 shall operate the feed wire, connected in Figure 29 to the battery it is connected to a suitable point of the wire of line 201 which itself is connected at the central exchange to the free pole of the battery; the other pole is earthed.

In most cases a subscriber can avoid using his battery when such is present by connecting the feed wire in the manner above set out For operating a switch (which replaces switch 223 and which has a function differing from this) he may during his absence disconnect both the feed wire from the line wire and connect it to its battery as illustrated in Figure 24.

It should be well understood that the arrangements illustrated are not exhaustive and that the feed circuit may easily be adapted for employment whenever it is desired to feed a subscriber's station with current from a central battery at the central telephone exchange without the use of a local battery with a view of telegraphing even when such telegraphing means is based upon a system which differs from that set out in the specification.

Finally there may be provided with advantage in the receiving arrangements or transmitting arrangements above described an amplifying arrangement based for example upon the use of three electrode valves. In this case the receiving relays above described which control either the retransmission circuit (at the "mixed position") or to the telegraphic receiving apparatus (at the subscriber's station) are themselves controlled by the amplifying arrangement.

What I claim is:—

1. In a telephone exchange system having a central station and subscribers' substations with line circuits connecting them, the combination of link circuits for interconnecting the said lines in pairs comprising relay means responsive to a break in one line circuit to produce a current impulse in the other line circuit, means at each substation respective to said impulses and means at each subscriber's station for varying the electrical condition of the associated line circuit which comprises a relay non-responsive to electrical variations produced at either subscriber's station.

2. In a telephone exchange system having a central station and subscribers' substations with line circuits connecting them, the combination of link circuits for interconnecting the said lines in pairs comprising an electromagnetic relay energized through a differential inductive coupling connected with the line through the link circuit and to an artificial line and to the link circuit for causing current variations originating in the line to actuate the relay and cause current variations originating in the link circuit to have no effect on the relay and means at each substation responsive to said last mentioned current variations.

3. In a telephone exchange system having a central station and subscribers' substations with line circuits connecting them, the combination of a special link circuit arranged to be connected with a pair of said line circuits, means interconnecting said link and line circuits, relay means in the link circuit operated by current impulses induced by an opening and closing of one line circuit to produce an amplified current impulse in the other line circuit, means at each substation responsive to said impulses, and means at each substation for opening and closing its line circuit.

4. The system claimed in claim 3 with means rendering the relay means non-responsive to said amplified current impulses.

5. In a telephone exchange system having a central station and subscribers' substations with line circuits connecting them, means for transmitting telegraphic communications between the subscriber's substations at the will of the subscriber, comprising the combination of link circuits for non-metallically interconnecting the said lines in pairs comprising means responsive to a break in one line circuit to produce a current impulse in the other line circuit, and means at each substation responsive to said impulses, each said responsive means consisting of a relay shunted by an inductance.

6. The system claimed in claim 5 in which the inductance shunting each relay constitutes the secondary winding of a transformer.

7. In a telephone exchange system having a central station and subscribers' stations with line circuits connecting them, the combination of a link circuit arranged to be interposed in the connection between two lines and comprising a battery, an electro-magnetic relay having a contact operable upon energization of the relay to connect the battery across the link circuit, a transformer having one secondary winding and two primary windings, the secondary winding being connected in the energizing circuit of the relay for energizing the same, an adjustable artificial line, said primaries being so connected that current coming in over the link circuit will traverse the said primaries in series with each other and the artificial line while current passing out from the said battery over said link circuit will traverse the said primary windings in multiple one out over the link circuit and one through the artificial line, together with receiving means at each subscriber's station responsive to currents induced in its associated line by the connection of said battery across the link circuit.

8. The combination claimed in claim 7 in which the voltage of the link circuit battery is adjusted to produce an outgoing impulse stronger than the originating or incoming impulse.

9. The combination claimed in claim 7 in which the said relay contact is shunted by a resistance to prevent arcing.

10. The combination claimed in claim 7 with audio choke coils connected between the terminals of the link circuit battery and the link circuit.

11. The combination claimed in claim 7 in which the relay is provided with a normal contact and an additional battery is provided and connected across said link circuit through said normal contact.

12. The combination claimed in claim 7 in which the relay is provided with a normal contact; a pair of audio choke coils; and an additional battery connected across the link circuit through the normal contact and said pair of audio choke coils.

13. The combination claimed in claim 7 with means for passing the telephonic currents past the battery.

In testimony that I claim the foregoing as my invention I have signed my name this 8th day of September, 1924.

PAUL JOLY.